US010769962B1

(12) United States Patent
Beigman Klebanov et al.

(10) Patent No.: US 10,769,962 B1
(45) Date of Patent: Sep. 8, 2020

(54) SYSTEMS AND METHODS FOR GENERATING A PERSONALIZATION SCORE FOR A CONSTRUCTED RESPONSE

(71) Applicant: Educational Testing Service, Princeton, NJ (US)

(72) Inventors: Beata Beigman Klebanov, Hopewell, NJ (US); Jill Burstein, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 424 days.

(21) Appl. No.: 15/145,459

(22) Filed: May 3, 2016

Related U.S. Application Data

(60) Provisional application No. 62/156,374, filed on May 4, 2015, provisional application No. 62/262,524, filed on Dec. 3, 2015, provisional application No. 62/274,529, filed on Jan. 4, 2016.

(51) Int. Cl.
  *G09B 19/00* (2006.01)
(52) U.S. Cl.
  CPC .................... *G09B 19/00* (2013.01)
(58) Field of Classification Search
  CPC ....................................................... G09B 19/00
  USPC ....................................................... 434/353
  See application file for complete search history.

(56) References Cited

U.S. PATENT DOCUMENTS

| 5,537,317 A * | 7/1996 | Schabes ................ G06F 17/274 704/9 |
| 2009/0197225 A1* | 8/2009 | Sheehan ................ G09B 17/00 434/169 |
| 2011/0027769 A1* | 2/2011 | Andreyev ................ G09B 7/00 434/362 |
| 2013/0275461 A1* | 10/2013 | Beigman Klebanov ..................... G06F 17/30389 707/769 |

OTHER PUBLICATIONS

Harackiewicz et al., (Harnessing Values to Promote Motivation in Education; Motivational Interventions: Advances in Motivation and Achievement, 18; Emerald Publishing limited: Bingley, UK; pp. 71-105; 2014).*
Abouelenien, Mohamed, Perez-Rosas, Veronica, Mihalcea, Rada, Burzo, Mihai; Deception Detection Using a Multimodal Approach; Proceedings of the 16th ACM International Conference on Multimodal Interaction; pp. 58-65; Nov. 2014.
Attali, Yigal, Burstein, Jill; Automated Essay Scoring With E-rater, v.2; Journal of Technology, Learning, and Assessment, 4(3); Feb. 2006.

(Continued)

*Primary Examiner* — Thomas J Hong
(74) *Attorney, Agent, or Firm* — Jones Day

(57) ABSTRACT

Computer-implemented systems and methods for generating a personalization score for a constructed response are provided. A constructed response generated by a user is received. The constructed response is processed with a processing system to generate one or more feature values representative of one or more aspects of the constructed response. A personalization score for the constructed (Continued)

response is generated using the processing system by applying a computer scoring model to the one or more feature values. The personalization score provides a measure of a personalization of the constructed response.

24 Claims, 6 Drawing Sheets

(56) References Cited

OTHER PUBLICATIONS

Aull, Laura, Lancaster, Zak; Linguistic Markers of Stance in Early and Advanced Academic Writing: A Corpus-Based Comparison; Written Communication, 31; pp. 1-33; 2014.
Beigman Klebanov, Beata, Beigman, Eyal, Diermeier, Daniel; Vocabulary Choice as an Indicator of Perspective; Proceedings of the 48th Annual Meeting of the Association for Computational Linguistics; Uppsala, Sweden; pp. 253-257; Jul. 2010.
Beigman Klebanov, Beata, Diermeier, Daniel, Beigman, Eyal; Automatic Annotation of Semantic Fields for Political Science Research; Journal of Information Technology and Politics, 5(1); pp. 95-120; Oct. 2008.
Beigman Klebanov, Beata, Flor, Michael; Word Association Profiles and Their Use for Automated Scoring of Essays; Proceedings of the 51st Annual Meeting of the Association for Computational Linguistics; Sofia, Bulgaria; pp. 1148-1158; Aug. 2011.
Beigman Klebanov, Beata, Madnani, Nitin, Burstein, Jill, Somasundaran, Swapna; Content Importance Models for Scoring Writing From Sources; Proceedings of the 52nd Annual Meeting of the Association for Computational Linguistics; Baltimore, MD; pp. 247-252; Jun. 2014.
Blanchard, Daniel, Heilman, Michael, Madnani, Nitin; SciKit-Learn Laboratory; GitHub repository, https://github.com/EducationalTestingService/skll; 2013.
Brown, Elizabeth, Smith, Jessi, Thoman, Dustin, Allen, Jill, Muragishi, Gregg; From Bench to Bedside: A Communal Utility Value Intervention to Enhance Students' Biomedical Science Motivation; Journal of Educational Psychology, 107(4); pp. 1116-1135; Nov. 2015.
Burstein, Jill, Chodorow, Martin, Leacock, Claudia; Automated Essay Evaluation: The Criterion Online Writing Service; AI Magazine, 25(3); pp. 27-36; Fall 2004.
Burstein, Jill, Kukich, Karen, Wolff, Susanne, Lu, Chi, Chodorow, Martin; Enriching Automated Essay Scoring Using Discourse Marking; Proceedings of the ACL Workshop on Discourse Relations and Discourse Marking; Montreal, Canada; pp. 15-21; Aug. 1998.
Burstein, Jill, Marcu, Daniel, Knight, Kevin; Finding the Write Stuff: Automatic Identification of Discourse Structure in Student Essays; Natural Language Processing, IEEE Intelligent Systems, 18(1); pp. 32-39; 2003.
Burstein, Jill, Tetreault, Joel, Chodorow, Martin; Holistic Annotation of Discourse Coherence Quality in Noisy Essay Writing; Dialogue and Discourse, 4(2); pp. 34-52; 2013.
Burstein, Jill, Tetreault, Joel, Madnani, Nitin; The E-rater Automated Essay Scoring System; Ch. 4, Handbook for Automated Essay Scoring, M. Shermis & J. Burstein (Eds.); Routledge; pp. 55-67; 2013.
Canning, Elizabeth, Harackiewicz, Judith; Teach It, Don't Preach It: The Differential Effects of Directly-Communicated and Self-Generated Utility-Value Information; Motivation Science, 1(1); pp. 47-71; 2015.
Coltheart, Max; The MRC Psycholinguistic Database; Quarterly Journal of Experimental Psychology, 33A; pp. 497-505; 1981.
Coxhead, Averil; A New Academic Word List; Tesol Quarterly, 34(2); pp. 213-238; Summer 2000.
Eccles, Jacquelynne; Who Am I and What Am I Going to Do With My Life? Personal and Collective Identities as Motivators of Action; Educational Psychologist, 44(2); pp. 78-89; 2009.
Eccles, Jacquelynne, Adler, Terry, Futterman, Robert, Goff, Susan, Kaczala, Caroline, Meece, Judith, Midgley, Carol; Expectancies, Values, and Academic Behaviors; Ch. 2 in Achievement and Achievement Motives: Psychological and Social Approaches, J. Spence (Ed.); W.H. Freeman and Company: San Fransisco, CA; pp. 75-146; 1983.
Gaspard, Hanna, Dicke, Anna-Lena, Flunger, Barbara, Brisson, Brigitte Maria, Hafner, Isabelle, Nagengast, Benjamin, Trautwein, Ulrich; Fostering Adolescents' Value Beliefs for Mathematics with a Relevance Intervention in the Classroom; Developmental Psychology, 51(9); pp. 1226-1240; Sep. 2015.
Greene, Stephan, Resnik, Philip; More than Words: Syntactic Packaging and Implicit Sentiment; Human Language Technologies: The 2009 Annual Conference of the North American Chapter of the ACL; Boulder, CO; pp. 503-511; Jun. 2009.
Harackiewicz, Judith, Canning, Elizabeth, Tibbetts, Yoi, Priniski, Stacy, Hyde, Janet; Closing Achievement Gaps With a Utility-Value Intervention: Disentangling Race and Social Class; Journal of Personality and Social Psychology; Nov. 2015.
Harackiewicz, Judith, Tibbetts, Yoi, Canning, Elizabeth, Hyde, Janet; Harnessing Values to Promote Motivation in Education; Motivational Interventions: Advances in Motivation and Achievement, 18; Emerald Publishing Limited: Bingley, UK; pp. 71-105; 2014.
Hidi, Suzanne, Harackiewicz, Judith; Motivating the Academically Unmotivated: A Critical Issue for the 21st century; Review of Educational Research, 70(2); pp. 151-179; Summer 2000.
Hu, Minquing, Liu, Bing; Mining and Summarizing Customer Reviews; Proceedings of ACM SIGKDD International Conference on Knowledge Discovery and Data Mining; pp. 168-177; 2004.
Hulleman, Chris, Godes, Olga, Hendricks, Bryan, Harackiewicz, Judith; Enhancing Interest and Performance With a Utility Value Intervention; Journal of Educational Psychology, 102; pp. 880-895; 2010.
Hulleman, Chris, Harackiewicz, Judith; Promoting Interest and Performance in High School Science Classes; Science, 326; pp. 1410-1412; Dec. 2009.
Leacock, Claudia, Chodorow, Martin, Gamon, Michael, Tetreault, Joel; Automated Grammatical Error Detection for Language Learners; Synthesis Lectures on Human Language Technologies; Morgan & Claypool Publishers; 2010.
Lin, Chin-Yew, Hovy, Eduard; The Automated Acquisition of Topic Signatures for Text Summarization; Proceedings of the 18th Annual Conference on Computational Linguistics, 1; Stoudsburg, PA; pp. 495-501; 2000.
Mihalcea, Rada, Strapparava, Carlo; The Lie Detector: Explorations in the Automatic Recognition of Deceptive Language; Proceedings of the 47the Annual Meeting of the Association for Computational Linguistics; Suntec, Singapore; pp. 309-312; Aug. 2009.
Mulholland, Matthew, Quinn, Joanne; Suicidal Tendencies: The Automatic Classification of Suicidal and Non-Suicidal Lyricists Using NLP; Proceedings of the 6th International Joint Conference on Natural Language Processing; Nagoya, Japan; pp. 680-684; Oct. 2013.
Neviarouskaya, Alena, Prendinger, Helmut, Ishizuka, Mitsuru; Recognition of Affect, Judgment, and Appreciation in Text; Proceedings of the 23rd International Conference on Computational Linguistics; Beijing, China; pp. 806-814; Aug. 2010.
Pedersen, Ted; Screening Twitter Users for Depression and PTSD with Lexical Decision Lists; Proceedings of the 2nd Workshop on Computational Linguistics and Clinical Psychology: From Linguistic Signal to Clinical Reality; Denver, CO; pp. 46-53; Jun. 2015.
Pedregosa, Fabian, Varoquaux, Gael, Gramfort, Alexandre, Michel, Vincent, Thirion, Bertrand, Grisel, Olivier, Blondel, Mathieu, Prettenhofer, Peter, Weiss, Ron, Dubourg, Vincent, Vanderplas, Jake, Passos, Alexandre, Cournapeau, David, Brucher, Matthieu, Perrot, Matthieu, Duchesnay, Edouard; Scikit-learn: Machine Learning in Python; Journal of Machine Learning Research, 12; pp. 2825-2830; 2011.
Pennebaker, James, Booth, Roger, Francis, Martha; Linguistic Inquiry and Word Count: LIWC2007; Lawrence Erlbaum Associates: Mahwah, NJ; 2001.

(56) References Cited

OTHER PUBLICATIONS

Perez-Rosas, Veronica, Mihalcea, Rada; Cross-Cultural Deception Detection; Proceedings of the 52nd Annual Meeting of the Association for Computational Linguistics (Short Papers); Baltimore, MD; pp. 440-445; Jun. 2014.

Pintrich, Paul; A Motivational Science Perspective on the Role of Student Motivation in Learning and Teaching Contexts; Journal of Educational Psychology, 95(4); pp. 667-686; 2003.

Ranganath, Rajesh, Jurafsky, Dan, McFarland, Dan; It's Not You, It's Me: Flirting and Its Misperception in Speed-Dates; Proceedings of the 2009 Conference on Empirical Methods in Natural Language Processing; Singapore; pp. 334-342; Aug. 2009.

Resnik, Philip, Garron, Anderson, Resnik, Rebecca; Using Topic Modeling to Improve Prediction of Neuroticism and Depression in College Student; Proceedings of the 2013 Conference on Empirical Methods in Natural Language Processing; Seattle, WA; pp. 1348-1353; Oct. 2013.

Shermis, Mark, Burstein, Jill, Elliot, Norbert, Miel, Shayne, Foltz, Peter; Automated Writing Evaluation: An Expanding Body of Knowledge; Ch. 26 in the Handbook of Writing Research, C. MacArthur et al. (Eds.); Guilford Press: New York, NY; pp. 395-409; 2015.

Somasundaran, Swapna, Burstein, Jill, Chodorow, Martin; Lexical Chaining for Measuring Discourse Coherence Quality in Test-taker Essays; Proceedings of Coling; Dublin, Ireland; pp. 950-961; Aug. 2014.

Stark, Anthony, Shafran, Izhak, Kaye, Jeffrey; Hello, Who is Calling?: Can Words Reveal the Social Nature of Conversations?; Proceedings of the 2012 Conference of the North American Chapter of the Association for Computational Linguistics: Human Language Technologies; Montreal, Canada; pp. 112-119; Jun. 2012.

Xiong, Wenting, Litman, Diane, Schunn, Christian; Natural Language Processing Techniques for Researching and Improving Peer Feedback; Journal of Writing Research, 4(2); pp. 155-176; 2012.

\* cited by examiner

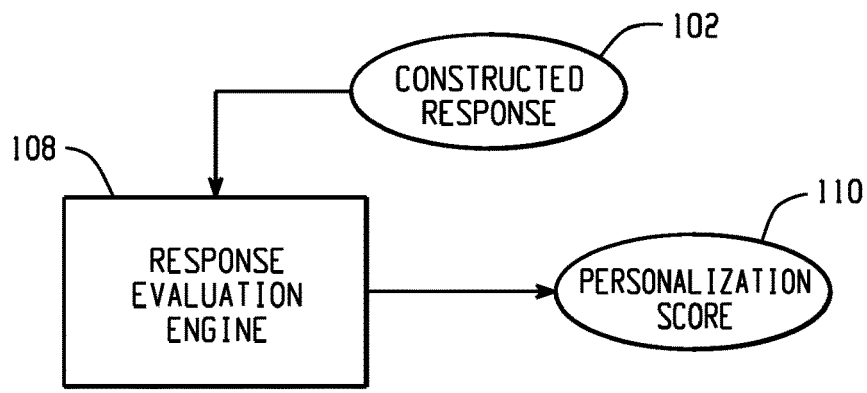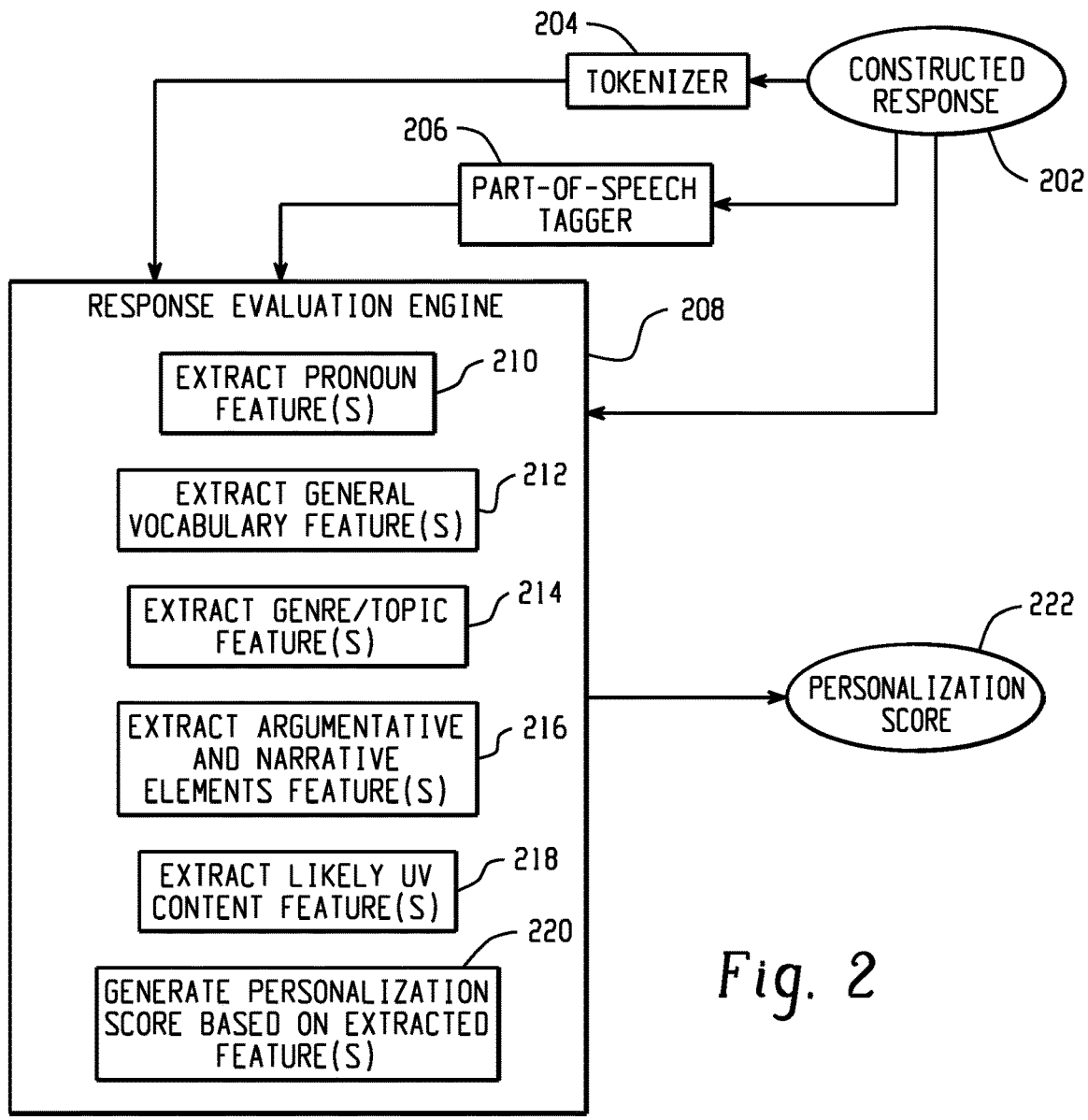

SYSTEMS AND METHODS FOR GENERATING A PERSONALIZATION SCORE FOR A CONSTRUCTED RESPONSE

CROSS-REFERENCE TO RELATED APPLICATIONS

The present application claims priority to U.S. Provisional Application Ser. No. 62/156,374, entitled "Towards Automated Evaluation of Writing Along STEM-Relevant Dimensions," filed May 4, 2015, to U.S. Provisional Application Ser. No. 62/262,524, entitled "Enhancing STEM Motivation Through Personal and Communal Values: Using NLP to Analyze and Assess Expression of Utility Value in Student Writing," filed Dec. 3, 2015, and to U.S. Provisional Application Ser. No. 62/274,529, entitled "Enhancing STEM Motivation Through Personal and Communal Values," filed Jan. 4, 2016, which are incorporated herein by reference in their entireties.

FIELD

This disclosure is related generally to automated scoring of writing and more particularly to computer-implemented systems and methods for generating a personalization score for a constructed response.

BACKGROUND

To evaluate the understanding, comprehension, or skill of students in an academic environment, the students are tested. Typically, educators rely on multiple-choice examinations to evaluate students. Multiple-choice examinations quickly provide feedback to educators on the students' progress. However, multiple-choice examinations may reward students for recognizing an answer versus constructing or recalling an answer. Thus, another method of evaluating students utilizes test questions that require a constructed response. Examples of constructed responses include free-form, non-multiple choice responses such as essays or show-your-work math responses. For some educators, use of a constructed response examination is preferred versus a multiple-choice examination because the constructed response examination requires the student to understand and articulate concepts in the tested subject matter. However, a length of time required to manually grade a constructed response by one or more humans may be considerable. Further, in some instances, a human grader may need special training before he or she is qualified to grade responses. In general, the manual scoring of constructed responses by humans can be time-intensive and costly.

SUMMARY

Computer-implemented systems and methods for generating a personalization score for a constructed response are provided. In a computer-implemented method of generating a personalization score for a constructed response, a constructed response generated by a user is received. The constructed response is processed with a processing system to generate one or more feature values representative of one or more aspects of the constructed response. A personalization score for the constructed response is generated using the processing system by applying a computer scoring model to the one or more feature values. The personalization score provides a measure of a personalization of the constructed response.

As another example, a computer-implemented system for generating a personalization score for a constructed response includes a processing system and computer-readable memory in communication with the processing system. The computer-readable memory is encoded with instructions for commanding the processing system to execute steps. In executing the steps, a constructed response generated by a user is received. The constructed response is processed to generate one or more feature values representative of one or more aspects of the constructed response. A personalization score for the constructed response is generated by applying a computer scoring model to the one or more feature values. The personalization score provides a measure of a personalization of the constructed response.

As a further example, a non-transitory computer-readable storage medium for generating a personalization score for a constructed response is provided. The computer-readable storage medium comprises computer executable instructions which, when executed, cause a processing system to execute steps. In executing the steps, a constructed response generated by a user is received. The constructed response is processed to generate one or more feature values representative of one or more aspects of the constructed response. A personalization score for the constructed response is generated by applying a computer scoring model to the one or more feature values. The personalization score provides a measure of a personalization of the constructed response.

BRIEF DESCRIPTION OF THE DRAWINGS

FIG. 1 is a block diagram depicting a response evaluation engine for generating a personalization score for a constructed response.

FIG. 2 is a block diagram depicting operations of a response evaluation engine.

DETAILED DESCRIPTION

Figure 3:
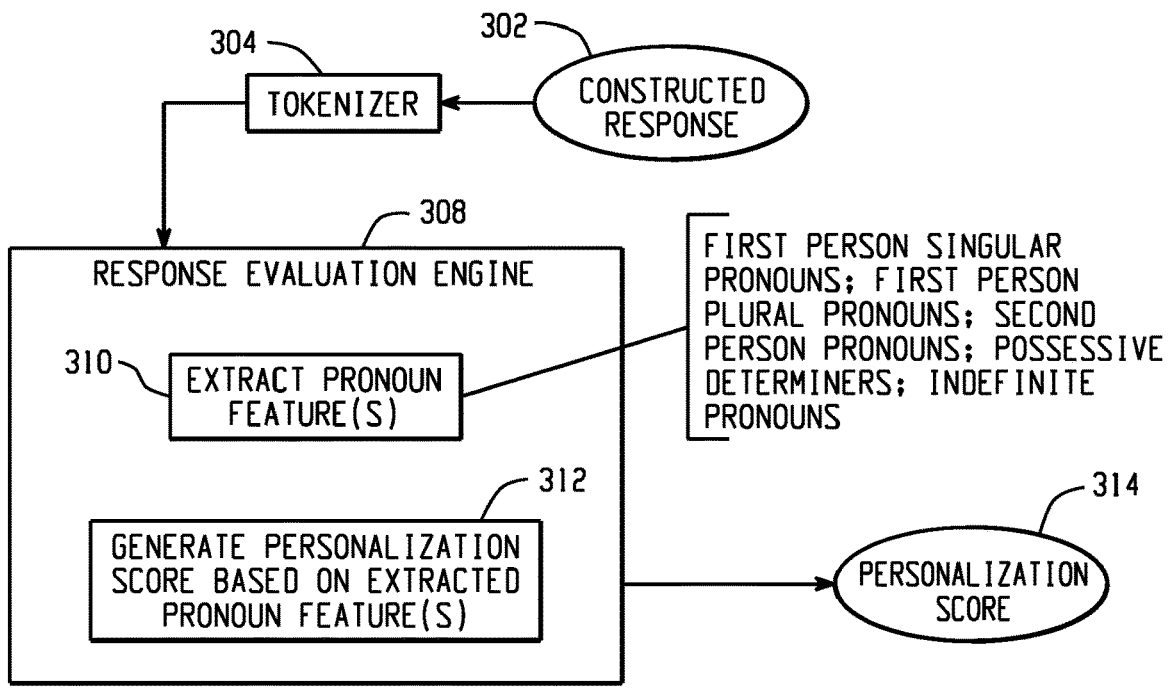
FIGS. 3-7 are block diagrams depicting example components used in implementing a response evaluation engine.

Approximately fifty percent of entering college students intending to major in STEM (Science, Technology, Engineering, and Mathematics) leave to pursue other majors or drop out of college altogether. Keeping students interested in science, technology, engineering, and mathematics courses may help in retaining students in STEM majors and keeping them on track for STEM careers. One way to develop interest in activities is to find meaning and value in those activities, and one type of task value that has proven to be a powerful predictor of interest, effort, and performance is utility value (UV). A person finds UV in a task if he or she believes it is useful and relevant beyond the immediate situation, for other tasks or aspects of a person's life. For example, "I will really need this for medical school," or "This material will be important when I take over the family farm." Correlational research indicates that when students perceive value in course topics, they work harder, develop more interest, and perform better.

Recent experimental research suggests that it is possible to promote perceived UV with interventions that ask students to write about the relevance of course topics to their own life. For example, it has been reported that a Utility Value Intervention (UVI) raised interest and grades for 9th grade science students who had low performance expectations, relative to a control group. It has also been reported that the same type of UVI promoted interest in an introductory psychology class for students who had performed poorly on early exams, relative to a control group. It has also been reported that in a double-blind randomized field experiment conducted in an introductory college biology course, the UVI boosted course performance for all students but was particularly effective among those who are traditionally most underrepresented in STEM (i.e., underrepresented minority students and first-generation college students).

Conventionally, humans manually review writing (e.g., essays, constructed responses generated by students, etc.) to evaluate UV in the writing. Under such conventional human scoring techniques, one or more human raters (e.g., graders) read users' writings and manually assign UV scores to the writings. The human raters may be, for example, specially-trained research assistants. The manual, human scoring techniques are typically time-intensive and costly.

To eliminate or decrease the need for such human scoring techniques, the approaches of the instant disclosure provide systems and methods for automated, computer-based evaluation of UV in writing. As described herein, the systems and methods utilize natural language processing (NLP) techniques, under which linguistic markers related to reflective writing are identified and combined using machine learning to provide an overall assessment of the utility value expressed in a user's (e.g., student's) written piece. The approaches of the instant disclosure may thus be used, for example, to help scale UVI interventions up beyond research studies. This may allow disciplinary instructors, for example, to assign UVI to students as homework to be performed using a technological platform, and the automatically-generated utility value score could be reported to the instructor.

FIG. 1 is a block diagram depicting a response evaluation engine 108 for generating a personalization score 110 for a constructed response 102. In an example, the constructed response 102 is a textual response that is generated by a user in response to a given item (e.g., a test question, task, etc.). The constructed response 102 is received at the response evaluation engine 108. Further, in examples described herein, data based on the constructed response 102 is received at the response evaluation engine 108. For instance, the constructed response 102 may be processed to determine one or more of individual words, n-grams (e.g., unigrams, bigrams, trigrams, four-grams, etc.), and parts of speech of the constructed response 102, and such data may be provided to the response evaluation engine 108. Further, in some examples, the response evaluation engine 108 receives the constructed response 102 and processes the constructed response 102 to determine such additional data (e.g., individual words, n-grams, parts of speech, etc.).

Based on the received constructed response 102 and/or other data associated with the constructed response 102, the response evaluation engine 108 generates a personalization score 110 for the constructed response 102. The personalization score 110 provides a measure of a personalization of the constructed response 102. For instance, the measure of the personalization can indicate a degree to which the constructed response 102 describes a relevance of a topic (e.g., a topic related to science, technology, engineering, or mathematics, etc.) to the writer or to one or more other persons (e.g., another person, a group of persons, people of society at-large, etc.). In examples, the personalization score 110 is a UV score, as described above. In such examples, the personalization score 110 may indicate a level of UV articulated in the constructed response 102.

An example constructed response 102 that may receive a relatively high personalization score 110 from the response evaluation engine 108 is as follows: "I heard that you are coming back to America after retirement and are planning on starting a winery. I am offering my help in choosing where to live that would promote the growth of grapes the best. Grapes are best grown in climates that receive large amounts of sunlight during the growing season, get moderate to low amounts of water, and have relatively warm summers. I highly recommend that you move to the west coast, and specifically the middle of the coast in California, to maximize the efficiency of your winery." Another example constructed response 102 that may receive a relatively high personalization score 110 from the response evaluation engine 108 is as follows: "An example of a trait that is acquired but not heritable is fitness. I am an athlete, so I exercise regularly for my sport. However, fitness is a trait I have acquired in my lifetime, not one that was written in my genes at birth. This means that it is not heritable, so I cannot pass it on to my children. If I want my kids to participate in sports, I will have to encourage them to exercise and play sports so that they can acquire fitness."

Although examples of the instant disclosure describe the generation of personalization scores 110 for constructed responses (e.g., constructed responses provided in response to a given item or task), it is noted that the systems and methods described herein may be used to determine a measure of personalization in any type of writing. Thus, the systems and methods may be used to assess UV in various types of writing (e.g., press releases, blog posts, magazine or newspaper articles, etc.), and such writing is not limited to constructed responses. When the response evaluation engine 108 is used in determining a personalization score 110 of a constructed response, it is noted that the constructed response need not be in response to an item or task that specifically elicits UV. Thus, while the approaches of the instant disclosure are useful in UV interventions and other similar scenarios (e.g., tests, homework assignments, and in-class exercises in which a student is asked to express UV in writing), these approaches are not limited to such scenarios.

FIG. 2 is a block diagram depicting operations of a response evaluation engine 208. In this figure, a constructed response 202 is received at a tokenizer 204 and at a part-of-speech tagger 206. The tokenizer 204 may "tokenize" the constructed response 202 into individual words, and the part-of-speech tagger 206 may be used to associate words of the constructed response 202 with part-of-speech tags (e.g., noun, verb, adjective, and adverb, etc.). Although the part-of-speech tagger 206 is shown as receiving the constructed response 202, in some examples, the part-of-speech tagger 206 operates on the output of the tokenizer 204 (e.g., the individual words of the constructed response 202, as determined by the tokenizer 204). The tokenizing and the part-of-speech tagging may be carried out using conventional, automated, computer-based algorithms known to those of ordinary skill in the art.

Various other processing and analysis may be performed on the constructed response 202, such as correction of spelling errors in the constructed response 202, using conventional, automated, computer-based algorithms known to those of ordinary skill in the art. The use of spelling correction algorithms can be beneficial to improve the quality of the personalization assessment being carried out by reducing the likelihood of complications in the assessment caused by the presence of spelling errors. Further, in examples, the constructed response 202 is processed to identify n-grams (e.g., unigrams, bigrams, trigrams, four-grams, etc.) in the constructed response 202. Although processing of the constructed response 202 is depicted in FIG. 2 as occurring outside of the response evaluation engine 208 (e.g., by the tokenizer 204 and part-of-speech tagger 206), in other examples, this processing is performed by the response evaluation engine 208. Thus, in these examples, the response evaluation engine 208 may tokenize the response 202, perform part-of-speech tagging on the response 202, identify n-grams of the response 202, and/or perform other processing of the response 202.

Outputs of the tokenizer 204 and part of speech tagger 206 are provided to the response evaluation engine 208. Further, in examples, the constructed response 202 is provided to the response evaluation engine 208 for analysis and/or processing. The response evaluation engine 208 includes one or more data processors configured to extract one or more pronoun features of the constructed response 202 at 210. The data processor(s) of the response evaluation engine 208 are further configured to extract from the constructed response 202 one or more general vocabulary features at 212, one or more genre/topic features at 214, one or more argumentative and narrative elements features at 216, and one or more likely UV content features at 218. Such features are described in further detail herein. Further, in examples, n-grams (e.g., unigrams, bigrams, trigrams, four-grams, etc.) are extracted from the constructed response 202 and utilized as features for scoring the constructed response 202.

The response evaluation engine 208 is configured to generate a personalization score 222 for the constructed response 202 at 220 based on the features extracted from the constructed response 202. The response evaluation engine 208 is a computer-based system for automatically scoring the constructed response 202 that requires no human intervention or minimal human intervention. In examples, the response evaluation engine 208 generates the personalization score 222 in an automated manner by applying a computer scoring model to the extracted features, where the personalization score 222 provides a measure of a personalization of the constructed response 202. The computer scoring model includes weighting factors for the extracted features, and the weighting factors are determined based on an analysis of human-scored writings. Such human-scored writings may be referred to herein as "training texts." The analysis of the human-scored writings may indicate correlations between features of constructed responses and human scores for those constructed responses. The computer scoring model may utilize a scoring equation. The generation of the computer scoring model is described in further detail below with reference to FIG. 8.

Although the example of FIG. 2 depicts the response evaluation engine 208 as extracting five different types of features (e.g., pronoun, general vocabulary, argumentative and narrative elements, genre/topic, and likely UV content features), in other examples, not all of these types of features are extracted. For instance, in examples, the response evaluation engine 208 extracts the pronoun features at 210, but does not extract the other features at 212, 214, 216, 218. In these examples, the response evaluation engine 208 utilizes a scoring model that is based specifically on the pronoun features. For example, in generating the scoring model, the pronoun features are extracted from human-scored training texts, and weights for the pronoun features are determined using a machine learning application. Accordingly, the response evaluation engine 208 generates the personalization score 222 based on the extracted pronoun features. Further, for instance, various combinations of features may be extracted and used in generating the personalization score 222. In one example, the response evaluation engine 208 extracts all features from the constructed response 202 except for the genre/topic features. The response evaluation engine 208 uses a scoring model tailored to the features extracted from the response 202 and generates the personalization score 222 based on such features.

FIG. 3 is a block diagram depicting a response evaluation engine 308 configured to extract one or more pronoun features from a constructed response 302. In this figure, the constructed response 302 is received at a tokenizer 304 that identifies individual words of the constructed response 302. Outputs of the tokenizer 304 are provided to the response evaluation engine 308. Further, in examples, the constructed response 302 is provided to the response evaluation engine 308 for analysis and/or processing. The response evaluation engine 308 includes one or more data processors configured to perform the operations described below.

Grammatical categories that signal self, a second person (e.g., an addressee of a letter), or other human reference may be typical in UV-rich writing. Accordingly, in the example of FIG. 3, the response evaluation engine 308 is configured to extract at 310 one or more feature values that are indicative of pronoun usage in the constructed response 302. Such feature values may include values based on a number of first person singular pronouns (e.g., I, me) in the constructed response 302, a number of first person plural pronouns (e.g., we, ourselves) in the constructed response 302, a number of second person pronouns (e.g., you) in the constructed response 302, a number of possessive determiners (e.g., their) in the constructed response 302, and/or a number of indefinite pronouns (e.g., anyone) in the constructed response 302. In examples, the one or more feature values extracted at 310 may include: log frequency per 1,000 words of first person singular pronouns in the constructed response 302, log frequency per 1,000 words of first person plural pronouns in the constructed response 302, log frequency per 1,000 words of second person pronouns in the constructed response 302, log frequency per 1,000 words of possessive determiners in the constructed response 302, and/or log frequency per 1,000 words of indefinite pronouns in the constructed response 302.

The response evaluation engine 308 generates at 312 a personalization score 314 for the constructed response based on the pronoun feature values extracted at 310. It is noted that not all of the different pronoun feature values described above are extracted, in examples. For instance, the response evaluation engine 308 may extract only a single pronoun feature value (e.g., log frequency per 1,000 words of first person singular pronouns in the constructed response 302) and generate the personalization score 314 based on the single feature value. In other examples, multiple of the pronoun feature values (e.g., a subset of the feature values, all of the feature values) are extracted and used by the engine 308 in determining the score 314.

Figure 4:
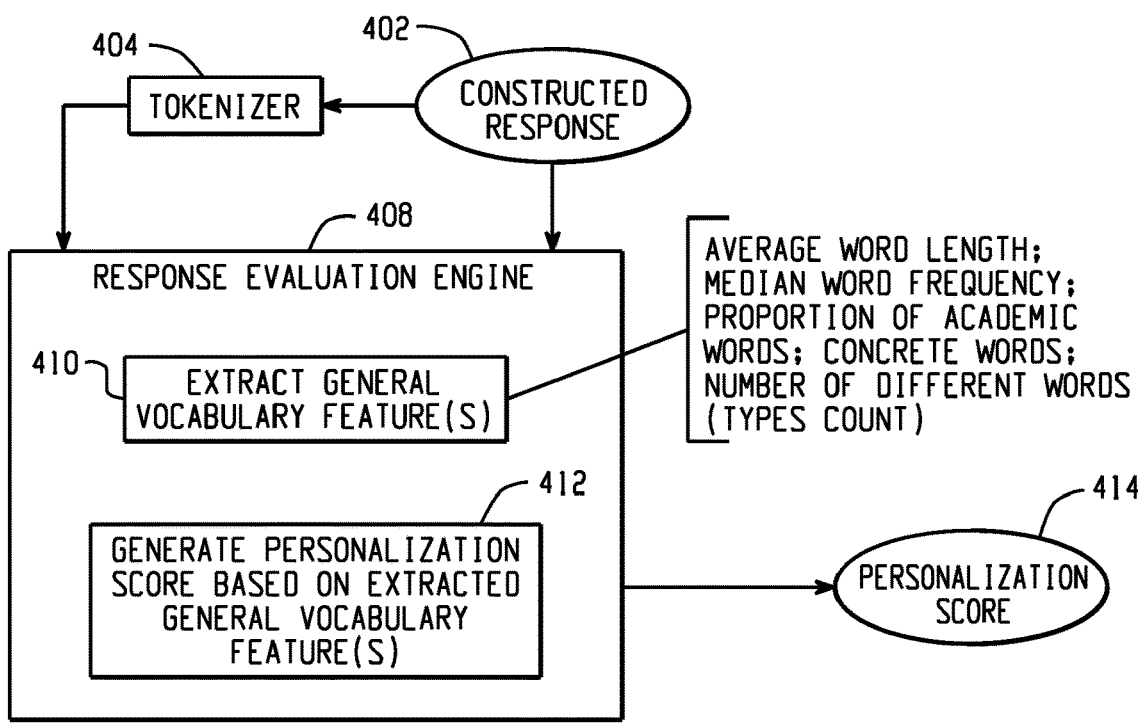

FIG. 4 is a block diagram depicting a response evaluation engine 408 configured to extract one or more general vocabulary features from a constructed response 402. In this figure, the constructed response 402 is received at a tokenizer 404 that determines individual words of the constructed response 402. Outputs of the tokenizer 404 are provided to the response evaluation engine 408. Further, in examples, the constructed response 402 is provided to the response evaluation engine 408 for analysis and/or processing. The response evaluation engine 408 includes one or more data processors configured to perform the operations described below.

Because expression of UV is likely to refer to everyday concerns and activities, it may be expected that essays rich in UV are less technical, on average, than essays that merely summarize a concept (e.g., essays that merely summarize the technical content of a biology lecture), and therefore use shorter, more common, and more concrete words, as well as a larger variety of words. Accordingly, in the example of FIG. 4, the response evaluation engine 408 is configured to extract at 410 one or more feature values that are indicative of general vocabulary usage in the constructed response 402. Such feature values may include (i) average word length of the constructed response 402, (ii) median word frequency of the constructed response 402, (iii) proportion of academic words in content words of the constructed response 402, (iv) log frequency per 1,000 words of the constructed response 402 of words from the MRC concreteness database, and (iv) number of different words (types count) in the constructed response 402.

In examples, the feature values extracted at 410 include a value indicative of a degree to which the constructed response 402 utilizes academic and/or a value indicative of a degree to which the constructed response utilizes concrete words. As referred to herein, an "academic word" is a word that appears with high frequency in English-language academic texts and may encompass the words listed in "A new academic word list," Coxhead, A., *TESOL Quarterly*, 34(2): 213-238 (2000), which is incorporated herein by reference in its entirety. As referred to herein, a "concrete" word is a word that refers to the objects or events that are available to the senses and may encompass the words listed in "The MRC psycholinguistic database," Coltheart, M., *Quarterly Journal of Experimental Psychology*, 33A:497-505 (1981), which is incorporated herein by reference in its entirety.

The response evaluation engine 408 generates at 412 a personalization score 414 for the constructed response based on the general vocabulary feature values extracted at 410. It is noted that not all of the different general vocabulary feature values described above are extracted, in examples. For instance, the response evaluation engine 408 may extract only a single general vocabulary feature value and generate the personalization score 414 based on the single feature value. In other examples, multiple of the general vocabulary feature values (e.g., a subset of the feature values, all of the feature values) are extracted and used by the engine 408 in determining the score 414.

Figure 5:
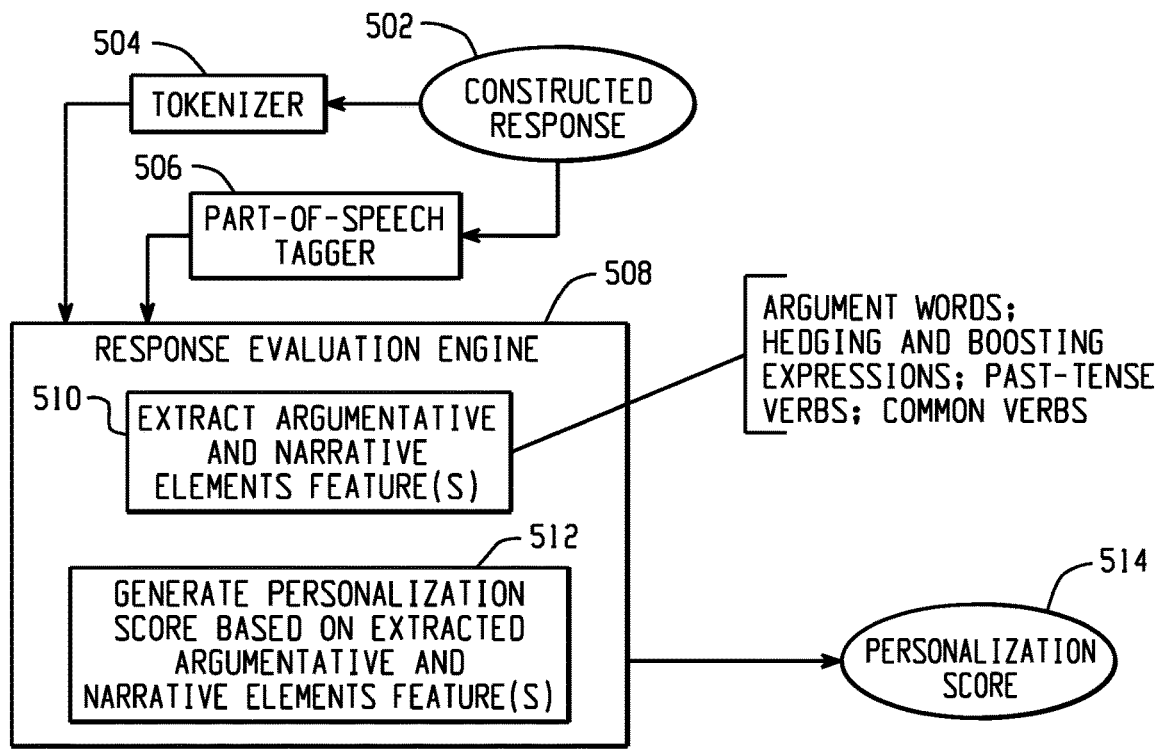

FIG. 5 is a block diagram depicting a response evaluation engine 508 configured to extract one or more argumentative and narrative elements features from a constructed response 502. In this figure, the constructed response 502 is received at a tokenizer 504 that determines individual words of the constructed response 502. The constructed response 502 is also received at a part-of-speech tagger 506 that may be used to associate words of the constructed response 502 with part-of-speech tags. Although the part-of-speech tagger 506 is shown as receiving the constructed response 502, in some examples, the part-of-speech tagger 506 operates on the output of the tokenizer 504 (e.g., the individual words of the constructed response 502, as determined by the tokenizer 504). Outputs of the tokenizer 504 and the part-of-speech tagger 506 are provided to the response evaluation engine 508. Further, in examples, the constructed response 502 is provided to the response evaluation engine 508 for analysis and/or processing. The response evaluation engine 508 includes one or more data processors configured to perform the operations described below.

While mere summaries of material (e.g., technical material, such as a biology lecture, etc.) are likely to be written in an expository, informational style, by contrast, one might expect UV-rich writing to be more argumentative, as the writer may need to put forth a claim regarding the relationship between their own or other persons' lives and some topic, along with necessary qualifications. Further, in order to connect some topic to the writer's own life, the writer might need to provide a personal mini-narrative, e.g., background with details about the events in his or her life that motivate the particular UV statement. A heavy reliance on past tense verbs is a hallmark of narrativity. Further, use of common action, mental, and desire verbs could signal sequences of actions and personal stance towards those, which are both relevant to UV writing.

Accordingly, in the example of FIG. 5, the response evaluation engine 508 is configured to extract at 510 one or more feature values that are indicative of vocabulary usage in the constructed response 502 that is characteristic of argumentative writing, hedging or boosting, and/or narrativity. In examples, the feature values extracted at 510 include one or more of (i) log token count of words in the constructed response 502 that could serve to develop an argument (e.g., "plausibly," "just as," "not enough," "specifically," "for instance," "unfortunately," "doubtless," "for sure," "supposing," "what if," etc.), (ii) log token count of hedging and boosting expressions in the constructed response 502 (e.g., "perhaps," "probably," "to some extent," "not entirely true," "less likely," "roughly," "naturally," "can never," "inevitably," "only way," "vital that," etc.), (iii) log frequency per 1,000 words of VBD (e.g., past-tense verbs) part-of-speech tags in the constructed response 502, and (iv) log frequency per 1,000 words of common verbs (e.g., "get," "go," "know," "put," "think," "want," etc.).

In examples where a feature value based on log token count of words in the constructed response 502 that could serve to develop an argument is extracted, one or more lists of words or expressions that could serve to develop an argument are defined. The one or more lists may be based on "Enriching automated essay scoring using discourse marking," Burstein, J. et al., in *Proceedings of the ACL Workshop on Discourse Relations and Discourse Marking*, pp. 15-21, Montreal, Canada (1998), which is incorporated herein by reference in its entirety. Thus, to identify words in the constructed response 502 that could be used to develop an argument, such identification is based on a set of words and/or expressions previously determined as being usable in developing an argument. In examples where a feature value based on log token count of hedging and boosting expressions in the constructed response 502 is extracted, one or more lists of words or expressions that qualify or enhance a claim are defined. The one or more lists may be based on "Linguistic markers of stance and advanced academic writing: A corpus-based comparison," Aull, L. L. and Lancaster, Z., *Written Communication*, 31:151-183 (2014), which is incorporated herein by reference in its entirety. Thus, to identify hedging and boosting expressions in the constructed response 502, such identification is based on a set of words and/or expressions previously determined as being usable in qualifying or enhancing a claim.

The response evaluation engine 508 generates at 512 a personalization score 514 for the constructed response 502 based on the argumentative and narrative elements feature values extracted at 510. It is noted that not all of the different argumentative and narrative elements feature values described above are extracted, in examples. For instance, the response evaluation engine 508 may extract only a single argumentative and narrative elements feature value and generate the personalization score 514 based on the single feature value. In other examples, multiple of the argumentative and narrative elements feature values (e.g., a subset of the feature values, all of the feature values) are extracted and used by the engine 508 in determining the score 514.

Figure 6:
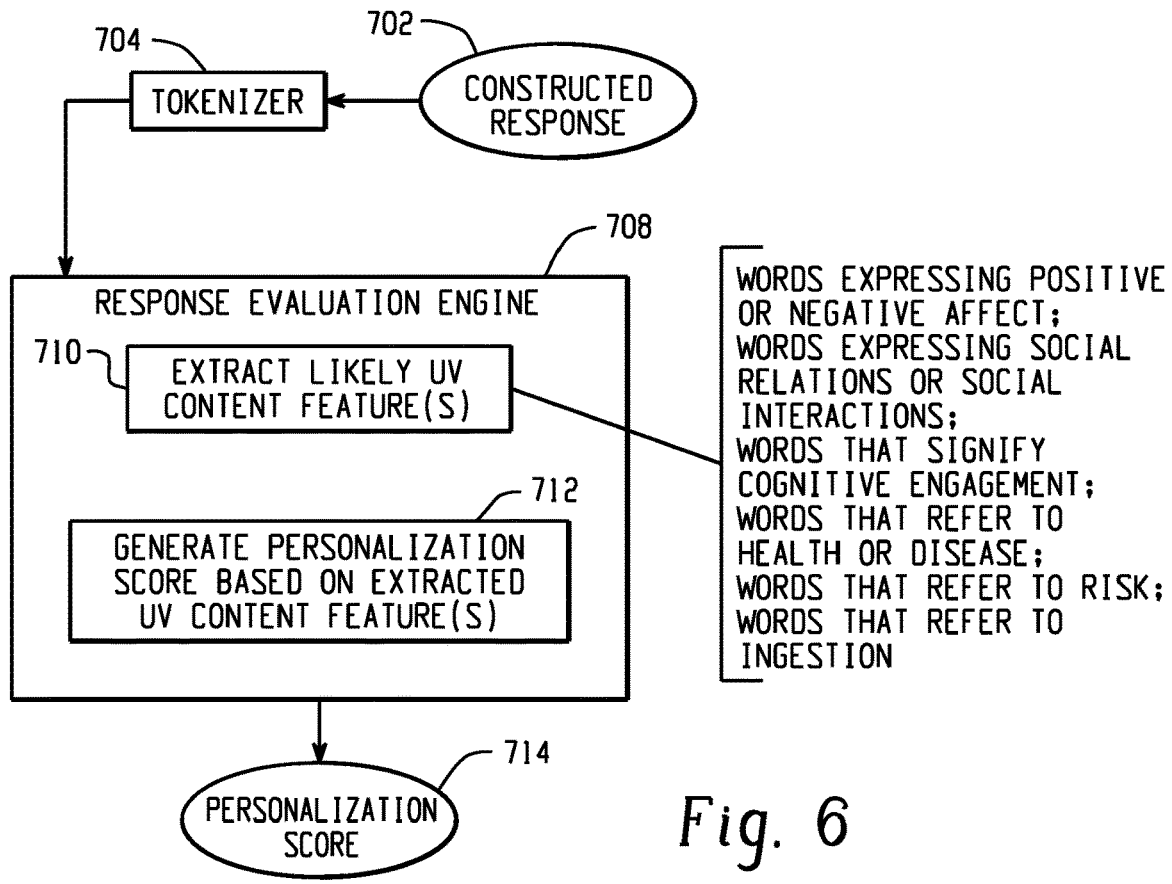

FIG. 6 is a block diagram depicting a response evaluation engine 708 configured to extract one or more likely UV content features from a constructed response 702. In this figure, the constructed response 702 is received at a tokenizer 704 that determines individual words of the constructed response 702. Outputs of the tokenizer 704 are provided to the response evaluation engine 708. Further, in examples, the constructed response 702 is provided to the response evaluation engine 708 for analysis and/or processing. The response evaluation engine 708 includes one or more data processors configured to perform the operations described below.

Building on qualitative observations of UV content (e.g., as seen in training data) and on previous research, one or more feature values are extracted that capture specific content and attitude using dictionaries from LIWC, as discussed in "The development and psychometric properties of LIWC2015," Pennebaker, J. et al., Austin, Tex.: University of Texas at Austin (2015)," which is incorporated herein by reference in its entirety. In particular, UV statements often mention the benefit of knowledge (e.g., scientific knowledge) for improving understanding and for avoiding unnecessary harm and risk. Specific themes often include considerations of health and diet. Accordingly, in the example of FIG. 6, the response evaluation engine 708 is configured to extract at 710 one or more feature values that are indicative of vocabulary usage in the constructed response that expresses positive or negative affect, that expresses social relations or social interactions, that expresses cognitive engagement, that refers to health or disease, that refers to risk, and/or that refers to ingestion.

In examples, the one or more feature values extracted at 710 include one or more of (i) log proportion of words in the constructed response 702 that express positive or negative affect (e.g., "love," "nice," "sweet," "hurt," "ugly," "nasty," etc.), (ii) log proportion of words in the constructed response 702 that express social relations or social interactions (e.g., "talk," "mate," "share," "child," etc.) as well as words in the LIWC categories of Family, Friends, Female, and Male, (iii) log proportion of words in the constructed response 702 that signify cognitive engagement (e.g., "think," "know," "consider," etc.), (iv) log proportion of words in the constructed response 702 that refer to matters of health or disease (e.g., "clinic," "flu," "pill," etc.), (v) log proportion of words in the constructed response 702 that refer to risk, danger, or things to avoid (e.g., "danger," "doubt," etc.), and (vi) log proportion of words in the constructed response 702 that refer to ingestion (e.g., "eat," "dish," "pizza," etc.). For each of these feature values (i)-(vi) that may be extracted at 710, reference lists of words and/or expressions may be defined. One or more of these reference lists may be based on the dictionaries from LIWC. Thus, for example, to identify words in the constructed response 702 that refer to ingestion, such identification is based on a list of words and/or expressions previously determined as being related to ingestion.

The response evaluation engine 708 generates at 712 a personalization score 714 for the constructed response 702 based on the likely UV content feature values extracted at 710. It is noted that not all of the different likely UV content feature values described above are extracted, in examples. For instance, the response evaluation engine 708 may extract only a single likely UV content feature value and generate the personalization score 714 based on the single feature value. In other examples, multiple of the likely UV content feature values (e.g., a subset of the feature values, all of the feature values) are extracted and used by the engine 708 in determining the score 714.

Figure 7:
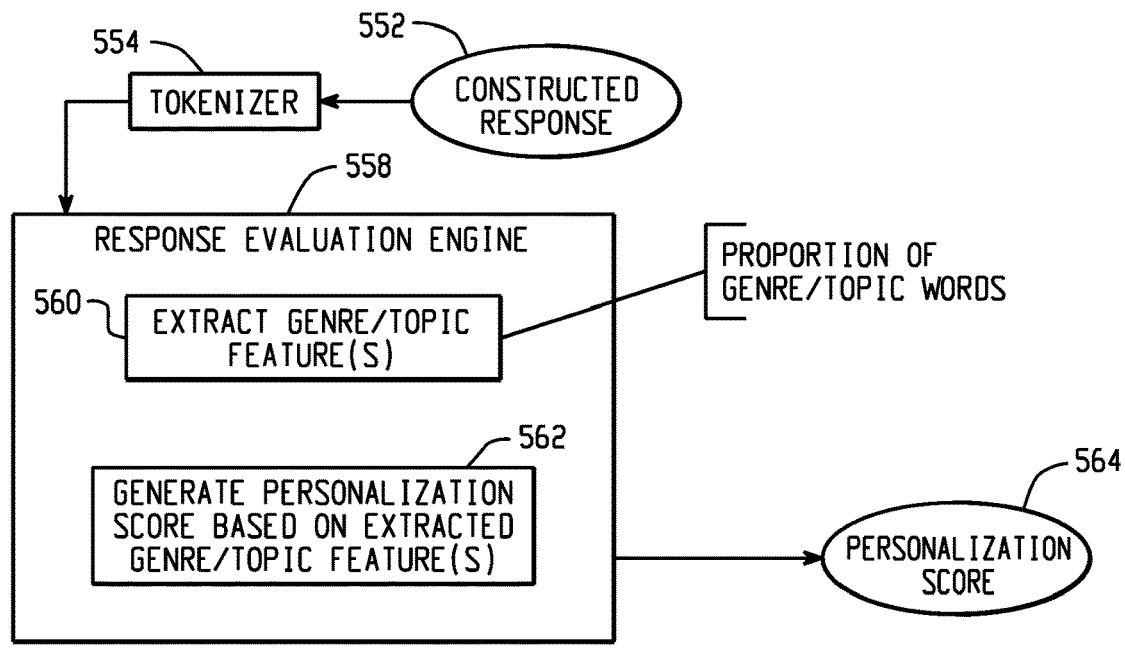

FIG. 7 is a block diagram depicting a response evaluation engine 558 configured to extract one or more genre/topic features from a constructed response 552. In this figure, the constructed response 552 is received at a tokenizer 554 that determines individual words of the constructed response 552. Outputs of the tokenizer 552 are provided to the response evaluation engine 558. Further, in examples, the constructed response 552 is provided to the response evaluation engine 558 for analysis and/or processing. The response evaluation engine 558 includes one or more data processors configured to perform the operations described below.

In the example of FIG. 7, the response evaluation engine 558 is configured to extract at 560 one or more feature values that capture use of language in the constructed response 552 that is common for writing of a given genre on a given topic. As referred to herein, a "genre" is a particular type of writing, e.g., a particular type of writing that a student is asked to generate in a homework question, test question, in-class exercise item, task, item, etc. To capture language in the constructed response 552 that is common for a particular genre/topic combination, a list of words and/or expressions that are typical of the particular genre/topic combination may be defined based on an analysis of existing student writing. Using this list, words in the constructed response 552 that are typical of a particular genre/topic combination can be identified.

To gather data used in generating the above-described list, students may be assigned one of several genres and asked to write about one of several topics. The genres include, in an example, a "Letter" genre (e.g., an item may request that the student write a letter to a family member or close friend, addressing a topic and discussing the relevance of the topic to the addressee), an "Essay" genre (e.g., an item may request that the student write an essay addressing a topic and discussing the relevance of the topic to the student's own life), a "Society" genre (e.g., an item may request that the student write an essay addressing a topic and discussing the relevance of the topic to people or society at-large), and a "Summary" genre (e.g., an item may request that the student summarize or address a topic). The topics include, in an example, evolution, genetics, cell biology, animal physiology, plant physiology, and ecology. Some of the student writing may be coded by specially-trained raters (e.g., human graders) for the level of UV articulated in the essay, on a scale of 0-4, based on how specific and personal the UV connection was to the individual. A "0" on this scale indicates no utility; a "1" indicates general utility applied to humans generically; a "2" indicates utility that is general enough to apply to anyone, but is applied to the individual; a "3" indicates utility that is specific to the individual; and a "4" indicates a strong, specific connection to the individual that includes a deeper appreciation or future application of the material. The human-scored writing may comprise training data that is used in training a computer scoring model, as discussed below with reference to FIG. 8.

To identify words in the collected student writing that occur commonly in a given genre for a given topic, a frequency-based method may be utilized. For each topic, words that have a higher frequency in the given genre ("in relevant documents") than in other genres taken together ("in irrelevant documents") are identified, for that topic. This provides, for example, a collection of words for Essay/Ecology (genre/topic) that are more frequent there than in Letter/Ecology, Summary/Ecology, and Society/Ecology, taken together. In this manner, a list of candidate genre_topic words for each genre and topic combination is generated. Note that the same word can appear in multiple genre/topic lists.

Using the genre/topic lists that are generated as described above, the response evaluation engine 558 may extract one or more feature values at 560 that capture use of language that is common for a given genre on a given topic. Such feature values are extracted under the assumption that, for example, different personal essays on Ecology might pick similar subtopics in Ecology and also possibly present similar UV statements. For a constructed response 552 in genre G on topic T, words that are typical of the genre G for the topic T (words in the G T list) are identified, in examples. Thus, for instance, if the constructed response 552 is in the genre "Letter" on topic "Ecology," words of the constructed response 552 that appear in the Letter/Ecology genre/topic list are identified. A word is typical of genre G for the topic T if it occurs more frequently in genre G on topic T than in all other genres taken together on topic T, as described above. The one or more feature values extracted at 560 include, specifically, a log of the type proportion of genre/topic words in the response 552 out of all words in the response 552. The response evaluation engine 558 generates at 562 a personalization score 564 for the constructed response 552 based on the genre/topic feature value extracted at 560.

Figure 8:
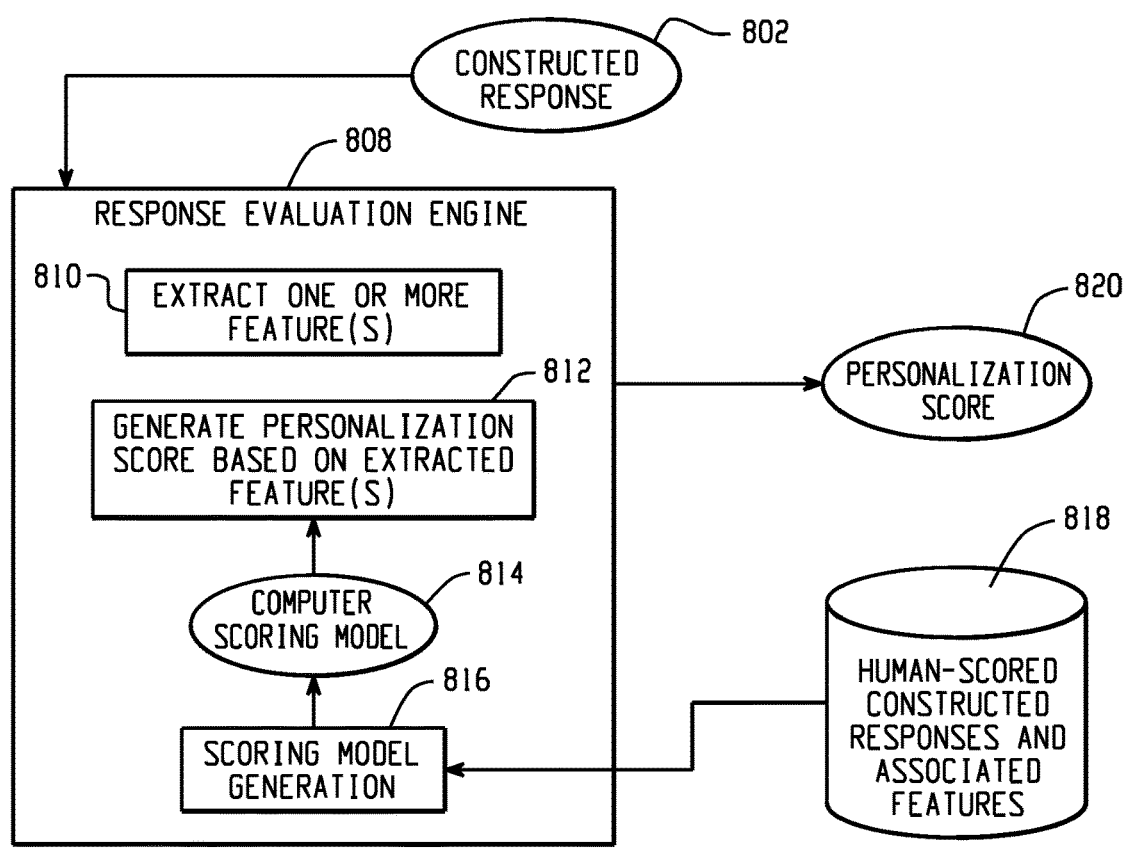
FIG. 8 is a block diagram depicting generation of a scoring model for use in generating personalization scores.

FIG. 8 is a block diagram depicting generation of a computer scoring model 814 for use in generating personalization scores in an automated manner. A collection of human-scored writings are assembled, such as in a computer-readable data store 818 that contains the human scores and a variety of different features (e.g., pronoun features, general vocabulary features, genre/topic features, argumentative and narrative elements features, likely UV content features, n-gram features, etc.) of those writings. In examples, humans score the writings according to the 0-4 scale described above. In examples, the human-scored writings stored in the data store 818 are those described above, which include student writings for multiple different genres (e.g., Essay, Letter, Society, and Summary genres, etc., as described above) and multiple different topics. The writings of the data store 818 may be manually scored by humans assessing a level of UV in the writings, as described above.

A scoring model generation module 816 of a response evaluation engine 808 performs an analysis of the human-scored writings to determine which features are predictive of human scores, in examples. For example, the scoring model generation module 816 may identify correlations between features and the assigned human score to select features that are predictive and/or to weight those features accordingly. In an example, the weighting factors of the model may be determined via a machine learning application trained based on the human-scored writings. Specifically, the machine learning application may utilize a linear regression analysis, a logistic regression analysis, a random forest regression analysis, decision tree analysis, random tree analysis, Classification And Regression Tree (CART) analysis, etc., or another type of algorithm or analysis.

The selected features (e.g., one or more of the pronoun features, general vocabulary features, genre/topic features, argumentative and narrative elements features, likely UV content features, and n-gram features described above) and their associated weights are stored as a computer scoring model 814 that is utilized for generating a personalization score 820 for another user writing 802 (e.g., a constructed response that has not been scored manually by a human). The constructed response 802 and/or data derived from the constructed response 802 (e.g., n-grams of the constructed response 802, individual words of the response 802, part-of-speech tags associated with words of the response 802, etc.) are provided to the response evaluation engine 808. The response evaluation engine 808 includes one or more data processors that are configured to extract one or more features of the constructed response 802 at 810. The one or more features extracted at 810 correspond to the features selected for use in the computer scoring model 814. The response evaluation engine 808 is configured to generate the personalization score 820 at 812 based on the extracted features and the scoring model 814 (e.g., the weights of the scoring model 814).

The features selected for use in the scoring model 814 vary in different examples. In some examples, the computer scoring model 814 is based on all of the features described herein (e.g., all of the pronoun features, general vocabulary features, genre/topic features, argumentative and narrative elements features, likely UV content features, and n-gram features described herein). In these examples, the computer scoring model 814 includes weights for all of these features, and all of these features are extracted at 810 and used in the generation of the personalization score 820 at 812. In other examples, the computer scoring model 814 is based on a subset (e.g., one feature, multiple features) of the features described herein. In these other examples, the computer scoring model 814 includes weights for the subset of selected features, and the subset of selected features are extracted at 810 and used in the generation of the personalization score 820 at 812.

In examples, the subset of extracted features comprises features of a single "feature family." For example, the pronoun features described above with reference to FIG. 3 may comprise one feature family, the general vocabulary features described above with reference to FIG. 4 may comprise a second feature family, the argumentative and narrative elements features described above with reference to FIG. 5 may comprise a third feature family, the likely UV content features described above with reference to FIG. 6 may comprise a fourth feature family, and the genre/topic features described above with reference to FIG. 7 may comprise a fifth feature family. By building the model 814 based on the features of the single family, this enables a determination of the extent to which the features of the family are predictive of human scores. Additionally, in examples, the model 814 is an n-gram model that utilizes n-gram features for generating the personalization score 820.

It is noted that under the approaches described herein, one or more computer-based models are used in determining the score 820. As described above, such computer-based models may be trained via a machine-learning application in order to determine weighting factors for the models. By contrast, conventional human scoring techniques for determining a score (e.g., a personalization score, UV score, etc.) for a writing include none of these steps. Conventional human scoring techniques involve one or more humans reviewing constructed responses and manually assigning scores to the responses. Additional distinctions between the approaches described herein and conventional human techniques are described throughout this disclosure. The approaches described herein are rooted in computer technology and are vastly different than conventional human techniques, as noted above. Accordingly, it is evident that the approaches described herein are not mere computer implementation of conventional human techniques and indeed are vastly different from such.

Figure 9:
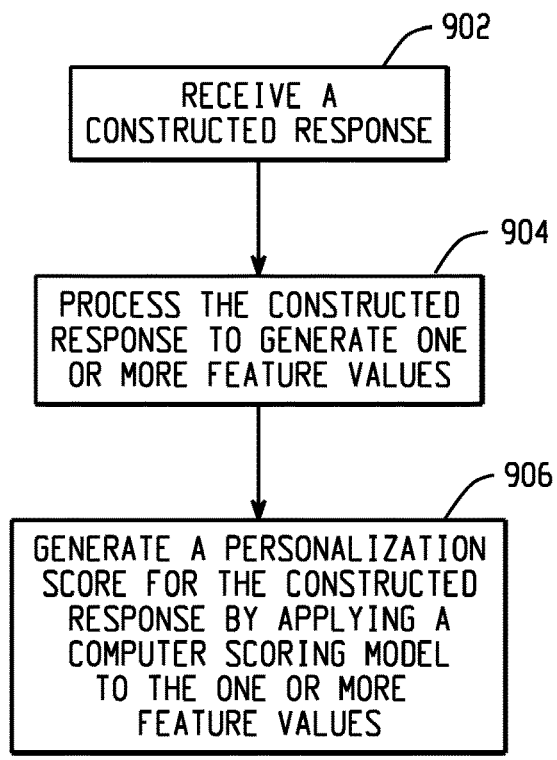
FIG. 9 is a flowchart depicting operations of an example computer-implemented method of generating a personalization score for a constructed response.

FIG. 9 is a flowchart depicting operations of an example computer-implemented method of generating a personalization score for a constructed response. At 902, a constructed response generated by a user is received. At 904, the constructed response is processed with a processing system to generate one or more feature values representative of one or more aspects of the constructed response. At 906, a personalization score for the constructed response is generated using the processing system by applying a computer scoring model to the one or more feature values. The personalization score provides a measure of a personalization of the constructed response.

Figure 10A:
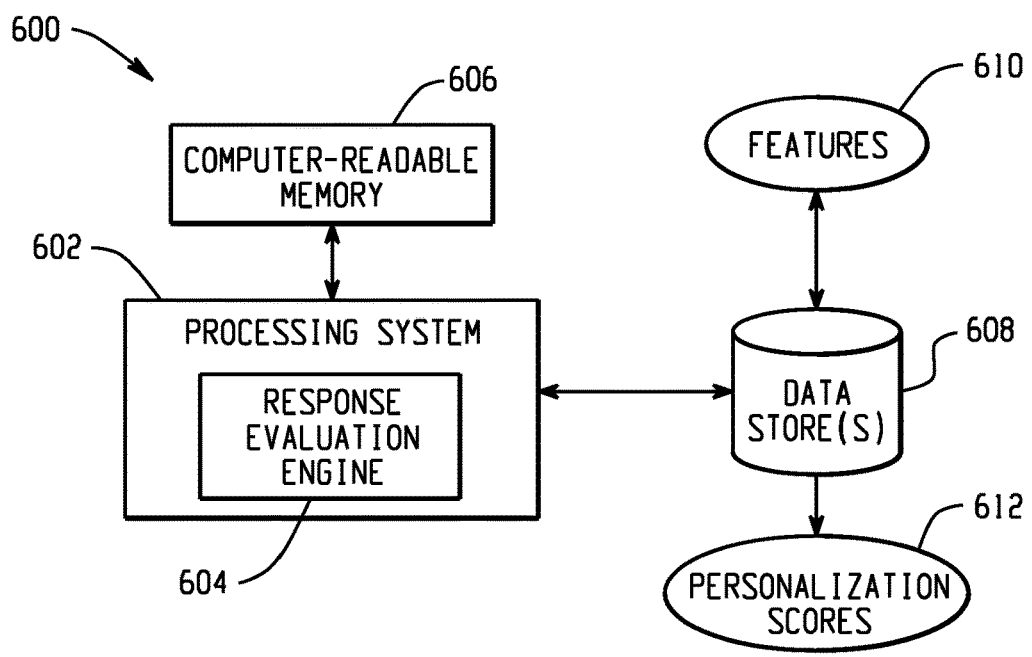
FIGS. 10A, 10B, and 10C depict example systems for use in implementing a response evaluation engine.
Figure 10B:
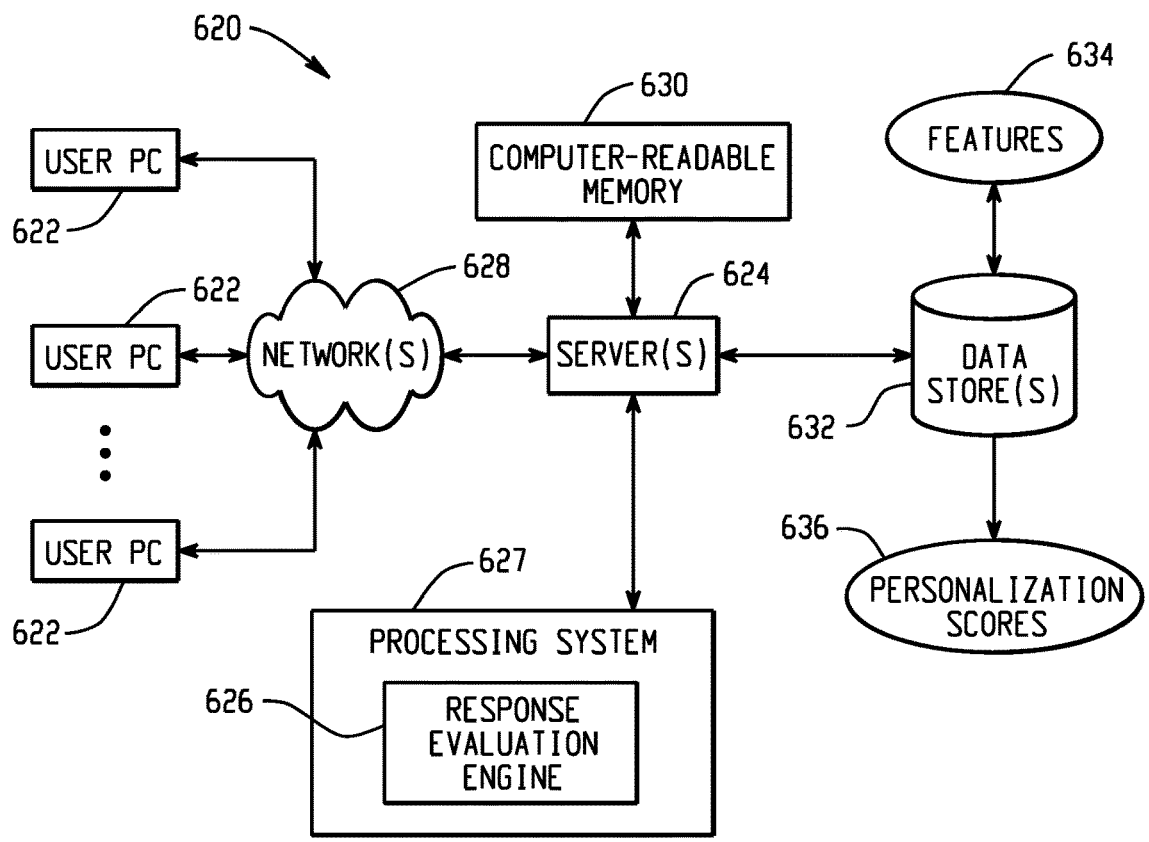
Figure 10C:
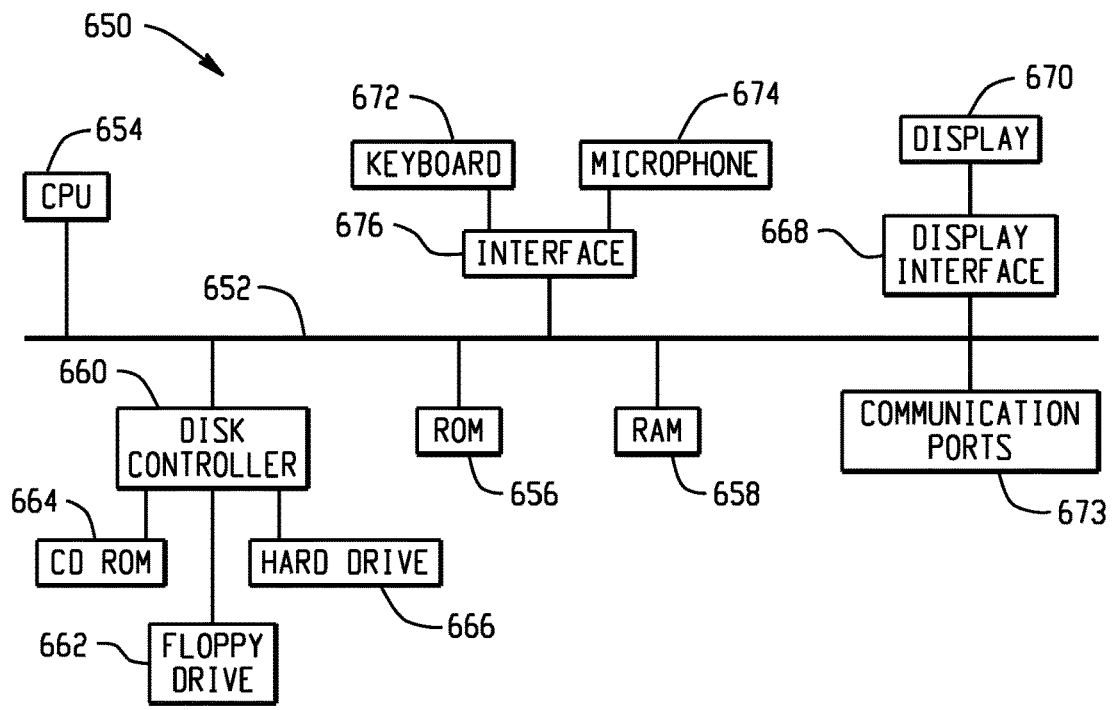

Examples have been used to describe the invention herein, and the scope of the invention may include other examples. FIGS. 10A, 10B, and 10C depict example systems for use in implementing a response evaluation engine, as described herein. For example, FIG. 10A depicts an exemplary system 600 that includes a standalone computer architecture where a processing system 602 (e.g., one or more computer processors located in a given computer or in multiple computers that may be separate and distinct from one another) includes a response evaluation engine 604 being executed on it. The processing system 602 has access to a computer-readable memory 606 in addition to one or more data stores 608. The one or more data stores 608 may include features 610 (e.g., pronoun features, general vocabulary features, genre/topic features, argument and narrative elements features, and/or likely UV content features, as described above) as well as personalization scores 612.

FIG. 10B depicts a system 620 that includes a client server architecture. One or more user PCs 622 access one or more servers 624 running a response evaluation engine 626 on a processing system 627 via one or more networks 628. The one or more servers 624 may access a computer readable memory 630 as well as one or more data stores 632. The one or more data stores 632 may contain features 634 as well as personalization scores 636.

FIG. 10C shows a block diagram of exemplary hardware for a standalone computer architecture 650, such as the architecture depicted in FIG. 10A that may be used to contain and/or implement the program instructions of system embodiments of the present disclosure. A bus 652 may serve as the information highway interconnecting the other illustrated components of the hardware. A processing system 654 labeled CPU (central processing unit) (e.g., one or more computer processors at a given computer or at multiple computers), may perform calculations and logic operations required to execute a program. A non-transitory processor-readable storage medium, such as read only memory (ROM) 656 and random access memory (RAM) 658, may be in communication with the processing system 654 and may contain one or more programming instructions for performing the method of implementing a response evaluation engine. Optionally, program instructions may be stored on a non-transitory computer readable storage medium such as a magnetic disk, optical disk, recordable memory device, flash memory, or other physical storage medium.

A disk controller 660 interfaces one or more optional disk drives to the system bus 652. These disk drives may be external or internal floppy disk drives such as 662, external or internal CD-ROM, CD-R, CD-RW or DVD drives such as 664, or external or internal hard drives 666. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 660, the ROM 656 and/or the RAM 658. Preferably, the processor 654 may access each component as required.

A display interface 668 may permit information from the bus 652 to be displayed on a display 670 in audio, graphic, or alphanumeric format. Communication with external devices may optionally occur using various communication ports 673.

In addition to the standard computer-type components, the hardware may also include data input devices, such as a keyboard 672, or other input device 674, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of generating a personalization score for a constructed response, the method comprising:
receiving, by a processing system having one or more data processors and one or more computer-readable medium encoded with instructions for commanding the processing system, a constructed response generated by a user;
processing the constructed response with the processing system to generate one or more feature values representative of one or more aspects of the constructed response, wherein processing the constructed response comprises:
identifying, using the processing system, words of the constructed response;
extracting, using the processing system, features from the words of the constructed response, wherein the extracted features are indicative of a level of utility value articulated in the constructed response and comprise a log frequency per 1000 words of first person pronouns and a total number of indefinite pronouns in the constructed response; and
generating, using the processing system, the one or more feature values based on the extracted features;
generating a personalization score for the constructed response using the processing system by applying a computer scoring model to the one or more feature values, the personalization score providing a measure indicative of the level of utility value articulated in the constructed response; and
displaying the personalization score.

2. The computer-implemented method of claim 1, wherein the one or more feature values are indicative of pronoun usage in the constructed response.

3. The computer-implemented method of claim 2, wherein the extracted features comprise:
a total number of first person singular pronouns in the constructed response;
a total number of first person plural pronouns in the constructed response;
a total number of second person pronouns in the constructed response; and
a total number of possessive determiners in the constructed response.

4. The computer-implemented method of claim 1, wherein the constructed response is on a topic, and wherein the one or more feature values are indicative of a degree to which the constructed response describes a relevance of the topic to the user or to one or more other persons.

5. The computer-implemented method of claim 4, wherein the topic relates to science, technology, engineering, or mathematics.

6. The computer-implemented method of claim 4, wherein the one or more feature values are indicative of vocabulary usage in the constructed response that is characteristic of the topic.

7. The computer-implemented method of claim 6, wherein processing the constructed response comprises:
identifying words of the constructed response that are characteristic of the topic based on a set of words previously determined to be characteristic of the topic, wherein the one or more feature values are based on a proportion of words in the constructed response that are characteristic of the topic.

8. The computer-implemented method of claim 1, wherein the one or more feature values are indicative of vocabulary usage in the constructed response.

9. The computer-implemented method of claim 8, wherein the one or more feature values include:
an average word length of the constructed response;
a median word frequency of the constructed response;
a value indicative of a degree to which the constructed response utilizes academic words;
a value indicative of a degree to which the constructed response utilizes concrete words;
a count of a number of different words used in the constructed response.

10. The computer-implemented method of claim 1, wherein the computer scoring model comprises multiple weighted variables determined by training the computer scoring model relative to a plurality of training data.

11. The computer-implemented method of claim 1, wherein the one or more feature values are (i) indicative of vocabulary usage in the constructed response that is characteristic of argumentative writing, and (ii) indicative of vocabulary usage in the constructed response that is characteristic of hedging or boosting.

12. The computer-implemented method of claim 1, wherein the one or more feature values are indicative of vocabulary usage in the constructed response that is characteristic of narrativity.

13. The computer-implemented method of claim 12, further comprising:
using a part-of-speech tagger to associate words of the constructed response with part-of speech tags;
processing the part-of-speech tags with the processing system to generate a value indicative of a degree to which the constructed response utilizes past-tense verbs, wherein the one or more feature values include the value, and
wherein the one or more feature values further include a value indicative of a degree to which the constructed response utilizes common verbs.

14. The computer-implemented method of claim 1, wherein the one or more feature values are (i) indicative of vocabulary usage in the constructed response that expresses positive or negative affect, (ii) indicative of vocabulary usage in the constructed response that expresses social relations or social interactions, (iii) indicative of vocabulary usage in the constructed response that expresses cognitive engagement, (iv) indicative of vocabulary usage in the constructed response that refers to health or disease, (v) indicative of vocabulary usage in the constructed response that refers to risk, and (vi) indicative of vocabulary usage in the constructed response that refers to ingestion.

15. A computer-implemented system for generating a personalization score for a constructed response, the system comprising:
a processing system; and
computer-readable memory in communication with the processing system encoded with instructions for commanding the processing system to execute steps comprising:
receiving, by the processing system having one or more data processors and one or more computer-readable medium encoded with instructions for commanding the processing system, a constructed response generated by a user;

processing the constructed response with the processing system to generate one or more feature values representative of one or more aspects of the constructed response, wherein processing the constructed response comprises:

identifying, using the processing system, words of the constructed response;

extracting, using the processing system, features from the words of the constructed response, wherein the extracted features are indicative of a level of utility value articulated in the constructed response and comprise a total number of first person pronouns and a log frequency per 1000 words of indefinite pronouns in the constructed response; and generating, using the processing system, the one or more feature values based on the extracted features;

generating a personalization score for the constructed response by applying a computer scoring model to the one or more feature values, the personalization score providing a measure indicative of the level of utility value articulated in the constructed response; and displaying the personalization score.

16. The computer-implemented system of claim 15, wherein the one or more feature values are indicative of pronoun usage in the constructed response.

17. The computer-implemented system of claim 15, wherein the constructed response is on a topic, and wherein the one or more feature values are indicative of a degree to which the constructed response describes a relevance of the topic to the user or to one or more other persons.

18. The computer-implemented system of claim 15, wherein the one or more feature values are indicative of vocabulary usage in the constructed response that is characteristic of a topic.

19. The computer-implemented system of claim 15, wherein the one or more feature values include an average word length of the constructed response,
a median word frequency of the constructed response,
a value indicative of a degree to which the constructed response utilizes academic words,
a value indicative of a degree to which the constructed response utilizes concrete words, and
a count of a number of different words used in the constructed response.

20. The computer-implemented system of claim 15, wherein the one or more feature values are (i) indicative of vocabulary usage in the constructed response that is characteristic of argumentative writing, and (ii) indicative of vocabulary usage in the constructed response that is characteristic of hedging or boosting.

21. The computer-implemented system of claim 15, wherein the one or more feature values are indicative of vocabulary usage in the constructed response that is characteristic of narrativity.

22. The computer-implemented system of claim 15, wherein the one or more feature values are (i) indicative of vocabulary usage in the constructed response that expresses positive or negative affect, (ii) indicative of vocabulary usage in the constructed response that expresses social relations or social interactions, (iii) indicative of vocabulary usage in the constructed response that expresses cognitive engagement, (iv) indicative of vocabulary usage in the constructed response that refers to health or disease, (v) indicative of vocabulary usage in the constructed response that refers to risk, and (vi) indicative of vocabulary usage in the constructed response that refers to ingestion.

23. A non-transitory computer-readable storage medium for generating a personalization score for a constructed response, the computer-readable storage medium comprising computer executable instructions which, when executed, cause a processing system to execute steps including:

receiving, by a processing system having one or more data processors for commanding the processing system, a constructed response at a tokenizer generated by a user;

processing the constructed response with the processing system to generate one or more feature values representative of one or more aspects of the constructed response, wherein processing the constructed response comprises:

identifying, using the processing system, words of the constructed response;

tokenizing, using the tokenizer, the words of the constructed response into individual words;

extracting, using the processing system, one or more features from the words of the constructed response, wherein the extracted features are indicative of a level of utility value articulated in the constructed response and comprise a log frequency per 1000 words of first person pronouns and a log frequency per 1000 words of indefinite pronouns in the constructed response; and generating the one or more feature values based on the one or more extracted features;

generating a personalization score for the constructed response by applying a computer scoring model to the one or more feature values, the personalization score providing a measure indicative of the level of utility value articulated in the constructed response; and displaying the personalization score.

24. The computer-implemented method of claim 1, wherein utility value is indicative of the user's belief that a subject of the constructed response is useful and relevant to other aspects of the user's life.

* * * * *